United States Patent [19]

Frailong et al.

[11] Patent Number: 5,265,233
[45] Date of Patent: Nov. 23, 1993

[54] METHOD AND APPARATUS FOR PROVIDING TOTAL AND PARTIAL STORE ORDERING FOR A MEMORY IN MULTI-PROCESSOR SYSTEM

[75] Inventors: Jean-Marc Frailong, Palo Alto; Pradeep Sindhu; Michel Cekleov, both of Mountain View; Michael Powell, Palo Alto; Eric Jensen, Livermore, all of Calif.

[73] Assignees: Sun Microsystems, Inc., Mountain View, Calif.; Xerox Corporation, Stamford, Conn.

[21] Appl. No.: 702,781

[22] Filed: May 17, 1991

[51] Int. Cl.[5] .............................. G06F 13/14
[52] U.S. Cl. .................... 395/425; 364/DIG. 1; 364/238.6; 364/238.7; 364/238.8; 364/238.9; 364/244.3; 364/228.3; 364/245.7
[58] Field of Search ... 364/200 MS File, 900 MS File; 395/400, 425

[56] References Cited

U.S. PATENT DOCUMENTS

| | | | |
|---|---|---|---|
| 4,136,386 | 1/1979 | Annunziata et al. | 395/425 |
| 4,881,168 | 11/1989 | Inagami et al. | 395/800 |
| 4,905,141 | 2/1990 | Brenza | 395/425 |
| 4,910,667 | 3/1990 | Tanaka et al. | 395/425 |
| 5,023,776 | 6/1991 | Gregor | 395/425 |
| 5,043,886 | 8/1991 | Witek et al. | 395/425 |
| 5,148,536 | 9/1992 | Witek et al. | 395/425 |
| 5,201,041 | 4/1993 | Bohner et al. | 395/425 |
| 5,202,972 | 4/1993 | Gusefski et al. | 395/425 |

Primary Examiner—Joseph L. Dixon
Assistant Examiner—Hiep T. Nguyen
Attorney, Agent, or Firm—Blakely, Sokoloff, Taylor & Zafman

[57] ABSTRACT

An improved memory model and implementation is disclosed. The memory model includes a Total Store Ordering (TSO) and Partial Store Ordering (PSO) memory model to provide a partial order for the memory operations which are issued by multiple processors. The TSO memory model includes a FIFO Store Buffer for Store, and Atomic Load-Store operations. The Load operations are not placed in the FIFO Store Buffer. The Load operation checks for a value stored in the same location in the FIFO Store Buffer; if no such value is found, then requested value is returned from memory. The PSO model also includes a Store Buffer for Store, and Atomic Load-Store operations. However, unlike the TSO model, the Store Buffer in the PSO model is not FIFO. The processors in the PSO model may issue the Store and Atomic Load-Store in a certain order; however, such operations may be executed by memory out of the order issued by the processors. The execution order is assured only by address matching and the STBAR operation. Two Store operations separated by a STBAR operations guarantees memory will execute the operations in an order issued by the processors. Load operations in the PSO model are not placed in the Store Buffer. The Load operation first checks for a value stored in the same location in the Store Buffer; if no such value is found, then the requested value is returned from memory.

17 Claims, 8 Drawing Sheets

METHOD AND APPARATUS FOR PROVIDING TOTAL AND PARTIAL STORE ORDERING FOR A MEMORY IN MULTI-PROCESSOR SYSTEM

BACKGROUND OF THE INVENTION

1. Field of the Invention

The present invention relates to memory systems for computers, and more particularly to improved memory models for use in a multiprocessor data processing system.

2. Art Background

A multiprocessor system includes a number of processors connected to a memory system. Processors typically interact with the memory system using Loads, Stores, and other synchronization operations such as atomic Load-Store. When running a program, processors may execute other operations, such as adding the contents of one register to another register, or performing a subroutine call; however, these operations do not affect the behavior of the memory system as observed by the processors. This behavior of the memory system as observed by the processors is referred to as the "memory model".

A "specification" of the memory model is a description of how the memory system ought to behave. The main purpose of such a specification is to allow hardware designers and programmers to work independently, while still ensuring that any program will work as intended on any implementation of a computer system that conforms to the specification. Ideally, a specification should be "formal", such that conformance to the specification can be verified at some level. In practice, however, in many instances the specifications are "informal" or even nonexistent, in which case a particular hardware implementation becomes the specification of the memory model by default.

Memory is modeled as an N port device, where N is the number of processors. The memory model applies to single as well as multiple processor systems. (See FIG. 1). A processor communicates with the memory system by issuing memory operations. A processor issues the operations through its respective port. As illustrated in FIG. 1, processor $P_1$ communicates with the memory system 10 through its respective Port 11. Similarly, Processor $P_N$ communicates to Memory 10 through Port $N$.

A memory model may range anywhere from Strong (or Sequential) Consistency to different types of weak consistency. Strong Consistency is the memory model that most programmers are familiar with. In a Strong Consistency model, the memory operations of all processors appear to execute in a single global order that is compatible with the issuing order of the individual processors. While this model is intuitively appealing and generally understood, it is also the one that provides the worst performance, particularly when the computer system includes numerous processors. For further information on the Strong Consistency model, see, L. Lamport, "How to Make a Multiprocessor Computer That Correctly Executes Multiprocess Programs", *IEEE Trans. on Computers*, September 1979.

Weaker memory models were developed to allow more efficient implementations of scalable multiprocessors. Unfortunately, weak memory models are more difficult to understand than Strong Consistency models, and they constrain the way parallel software programs can be written. Implementing weaker memory models also requires considerably more care on the part of hardware designers, and using weaker memory models requires a conscious effort on the part of programmers to avoid incorporating the model provided by Strong Consistency.

Thus, the choice of a memory model involves making a trade-off between what is convenient for programming versus what provides the potential for high performance in hardware. For more information on this trade-off, see, J. Hennessy et al., "Hardware/Software Tradeoffs for Increased Performance", *Proc. Symp. Architectural Support for Programming Languages and Operating Systems*, (1982) pp. 2-11.

As will be described, the present invention describes a formal specification for two improved memory models, Total Store Ordering (TSO) and Partial Store Ordering (PSO), both of which are "strong" enough to be convenient to program and are also "weak" enough to provide high performance.

SUMMARY OF THE INVENTION

An improved memory architecture is disclosed, having two particular models, Total Store Ordering (TSO) and Partial Store Ordering (PSO). Both memory models define the semantics of memory operations such as Load and Store, and specify how the order in which these operations are issued by a processor is related to the order in which they are executed by memory. The models apply both to uniprocessors and shared memory multiprocessors. Machines that implement a Strong Consistency memory model also support both TSO and PSO because the requirements of Strong Consistency are more stringent. PSO is a higher performance version of TSO.

The Total Store Ordering (TSO) memory model guarantees that the Store, Flush, and atomic Load-Store operations of all processors are executed by memory serially in a single order called the "memory order". Furthermore, the sequence of Store, Flush, and atomic Load-Store operations in the memory order for a given processor is identical to the sequence in which they were issued by the processor. Stores, Flushes, and atomic Load-Stores issued by a processor are placed in a dedicated FIFO Store Buffer of the processor.

In the event of a Load operation, the processor first determines if the Store Buffer of the processor contains a Store to the same memory location. If the Store Buffer of the processor does contain such a Store, then the Load operation returns the value of the most recent such Store; otherwise the Load operation goes directly to Memory, and the processor is blocked, i.e., prohibited from issuing further memory operations until the Load operation returns a value.

An atomic Load-Store operation behaves like both a Load and a Store operation. The atomic Load-Store operation is placed in the Store Buffer (similar to a Store operation), and the atomic Load-Store blocks the processor as in the case of a Load operation. In other words, the atomic Load-Store operation blocks the processor until the Store Buffer of the processor is empty and then proceeds to Memory.

The Partial Store Ordering (PSO) memory model guarantees that the Store, Flush, and atomic Load-Store operations of all processors are executed by memory serially in the memory order. However, the memory order of Store, Flush, and atomic Load-Store operations for a given processor is, in general, not the same as the order in which they were issued by that processor. Conformance between issuing order and memory order is provided by use of a new instruction called STBAR which indicates that all store instructions issued before the STBAR instruction must complete execution before any Store instructions are issued after a STBAR instruction. If two operations are separated by a STBAR in the issuing order of a processor, or if the two operations reference the same memory location, then the memory order of the two corresponding operations is the same as the issuing order.

Stores, Flushes, and atomic Load-Stores issued by a processor are placed in a dedicated Store Buffer of the processor. Although the Store Buffer of the Partial Store Ordering memory model is not FIFO, the Store Buffer of the processor does maintain the order of Stores and atomic Load-Stores to the same memory location; otherwise, the Store Buffer is partitioned only by STBAR instructions.

DETAILED DESCRIPTION OF THE INVENTION

An improved memory architecture is disclosed having particular application for use in Load/Store architecture computer systems. In the following description, for purposes of explanation, specific memory devices, architectures and components are set forth in order to provide a thorough understanding of the present invention. However, it will be apparent to one skilled in the art that the present invention may be practiced without these specific details. In other instances well known circuits are shown in diagram form in order not to obscure the present invention unnecessarily.

BASIC MEMORY MODEL

The specification for the memory architecture of the present invention is a model which specifies the behavior observed by software programs running on computer systems. The hardware can be implemented in any manner, as long as the implementation conforms to the memory model. A specification of the memory model allows software programs and hardware implementations to be developed independently, while still allowing any software program to run on any implementation.

Figure 1:
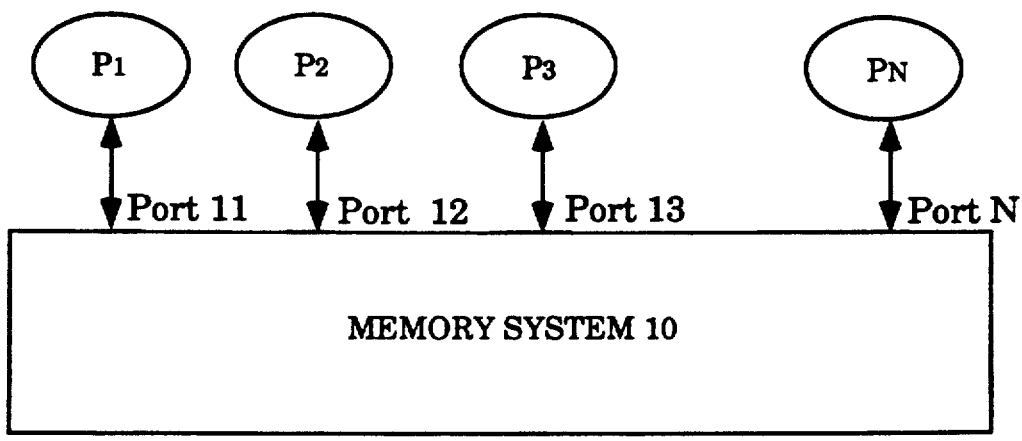
FIG. 1 is a block diagram representation of prior art multiple processors coupled to a memory system incorporating the teachings of the present invention.
Figure 2:
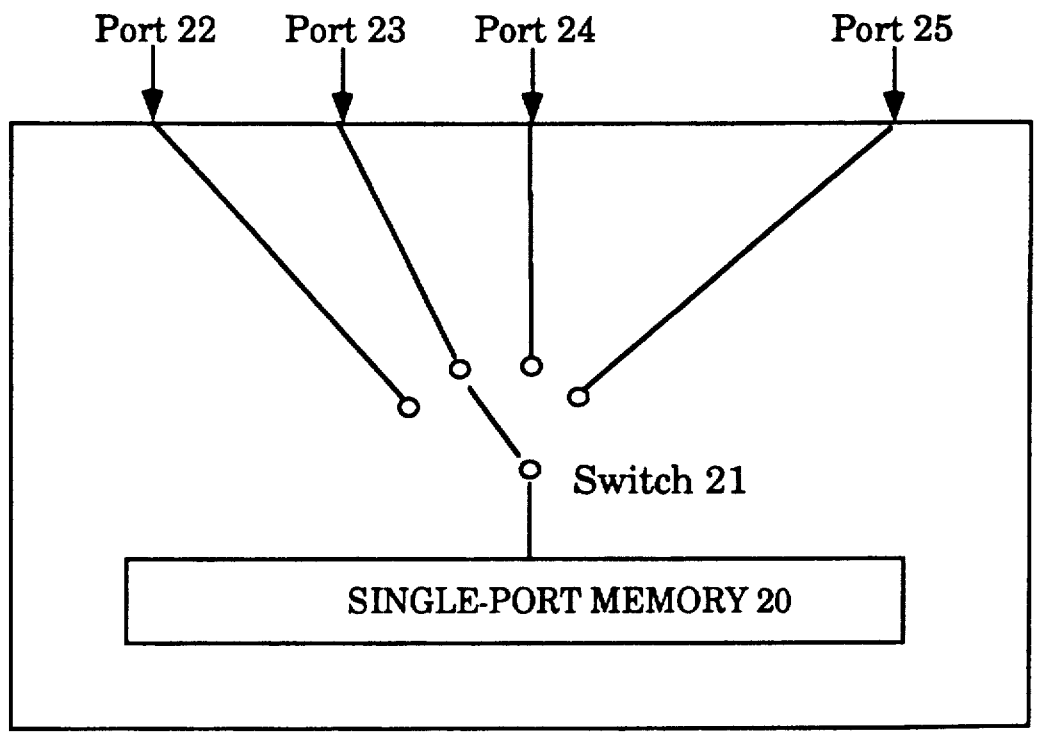
FIG. 2 is a conceptual illustration of a prior art Strong Consistency memory model.

With reference to FIG. 2, a conceptual illustration of a prior art Strong Consistency memory system is shown in diagram form. Conceptually, the single port Memory 20 receives memory operations from the processors through a "switch" 21. Each processor issues memory operations through the private port of that processor. As shown in FIG. 2, the ports of the respective processors are identified by the numerals 22, 23, 24 and 25. The order in which memory executes the operations corresponds to the order in which the switch selects the ports of the processors. The actual selection process is conceptually illustrated by the switch 21 moving between port 22, port 23, port 24 and port 25.

Figure 3:
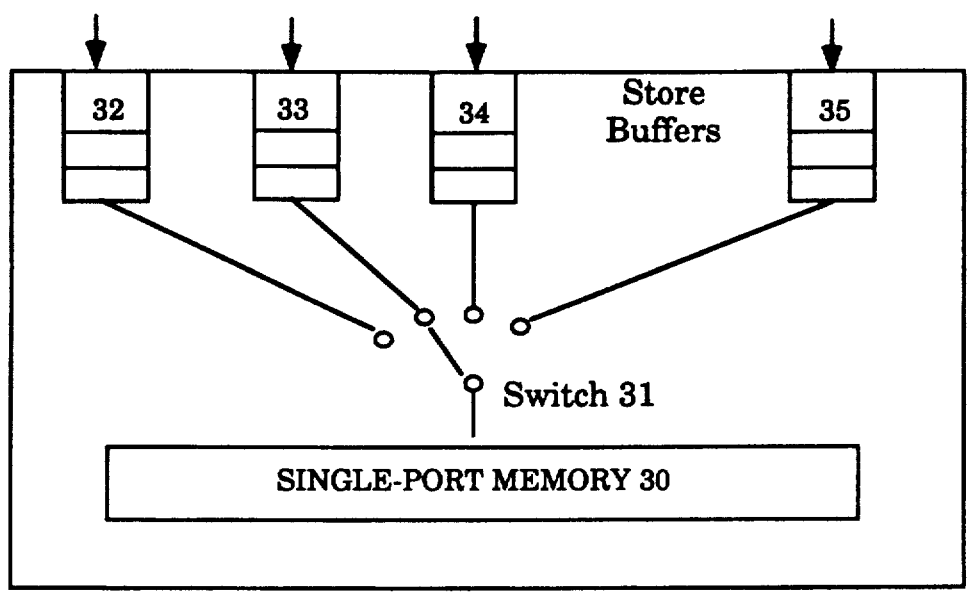
FIG. 3 is a conceptual illustration of a memory model utilizing the teachings of the present invention.

With reference to FIG. 3, a conceptual illustration of the memory model incorporating the teachings of the present invention is shown in diagram form. As described previously, each processor issues memory operations through its port to a single port Memory 30. Each port of a processor contains a dedicated Store Buffer, for example, Store Buffer 32, 33, 34 or 35, which holds Stores, Flushes, and atomic Load-Stores. Conceptually, a switch 31 connects the single port Memory 30 to one of the ports of the processor at a time, for the duration of each memory operation. The order in which the switch 31 moves from one port to another is nondeterministic from a program standpoint and defines the memory order of memory operations. Additional details regarding the structure and operation of the present invention's memory model are described below.

An atomic Load-Store instruction is defined to be the atomic sequence "Load followed by a Store of a value which is some arbitrary function of the value returned by the Load." For example, Swap, Compare-and-Swap, and Fetch-and-Add are all atomic Load-Store operations.

Figure 4:
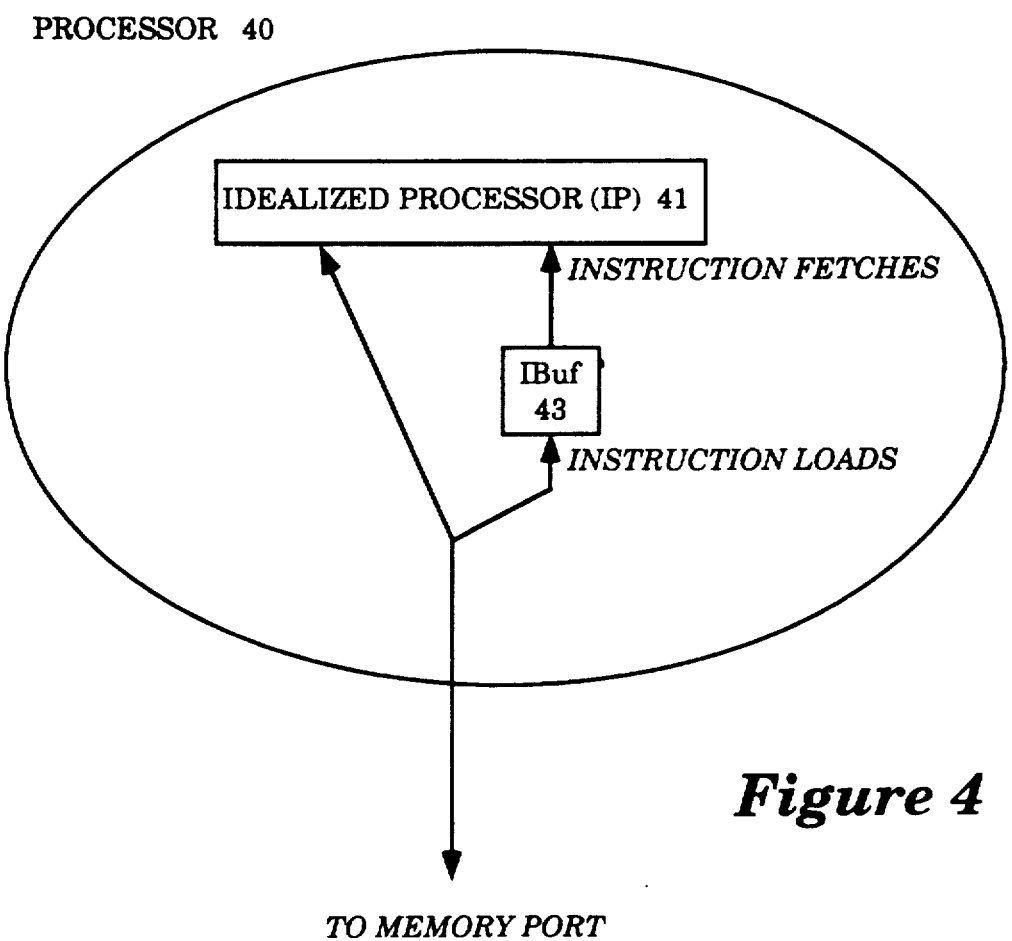
FIG. 4 is a conceptual illustration of a processor.

With reference to FIG. 4, a conceptual illustration of a processor is shown. A processor 40 includes an Idealized Processor (IP) 41 and an Instruction Buffer (IBuf) 43. The Idealized Processor 41 executes instructions one at a time with no overlap. For each instruction, the Idealized Processor 41 fetches the instruction from the Instruction Buffer 43, executes the instruction, and issues any data Loads and Stores directly to the memory port of the processor. If the instruction is not already in the Instruction Buffer 43, Instruction Buffer 43 issues an instruction Load through the memory port of the processor for each instruction fetched by the Idealized Processor 41. The Instruction Buffer 43 may prefetch instructions through the memory port rather than waiting for an instruction fetched from the Idealized Processor 41.

The memory architecture of the present invention is disclosed having two models referred to as Total Store Ordering (TSO) and Partial Store Ordering (PSO).

TOTAL STORE ORDERING (TSO)

Figure 5:
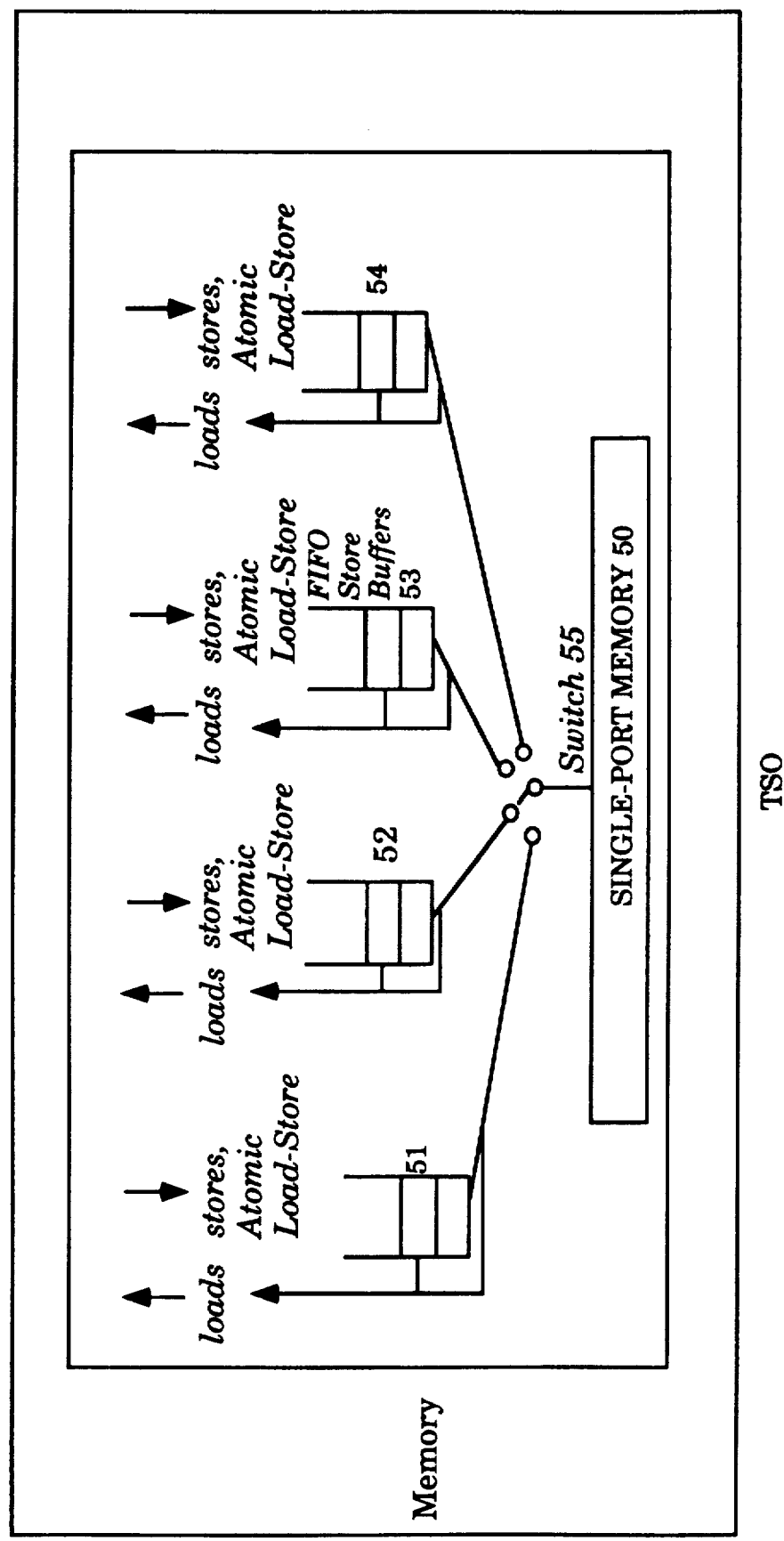
FIG. 5 is a conceptual illustration of a Total Store Ordering (TSO) memory model utilizing the teachings of the present invention.

With reference to FIG. 5, the Total Store Ordering (TSO) memory model of the present invention is disclosed conceptually in diagram form. Each port of a processor contains a dedicated FIFO Store Buffer (identified by the numerals 51, 52, 53 or 54). A processor issues memory operations to a single port Memory 50 through the respective port of the processor. Conceptually, a switch 55 connects the single port Memory 50 to one of the ports at a time, for the duration of each memory operation. The Stores, Flushes, and atomic Load-Stores issued by the processor are placed in the FIFO Store Buffer of the processor. The TSO memory model guarantees that the Store, Flush, and atomic Load-Store instructions of all processors are executed by the single port Memory 50 serially with what is called the "memory order." The memory order of these operations corresponds to the order in which the ports of the processors are selected. The selection process is conceptually illustrated by the switch 55 moving between the ports containing Store Buffers 51, 52, 53 and 54. Thus, the order in which the single port Memory 50 executes these operations for a given processor is the same as the order in which the processor issued them.

When the processor issues a Load operation, the processor first checks the dedicated FIFO Store Buffer of the processor to determine if the Store Buffer contains a Store operation to the same memory location as the issued Load operation. If the FIFO Store Buffer of the processor does contain a Store operation to that same memory location, then the Load operation returns the value of the most recent Store operation, otherwise the Load operation goes directly to the single port Memory 50. The processor is prohibited from issuing any memory operations after the Load until the Load operation returns a value.

An atomic Load-Store operation behaves like a Load and a Store operation. Similar to a Store operation, the atomic Load-Store operation is placed in the FIFO Store Buffer of the processor; the atomic Load-Store operation also blocks the processor (similar to a Load operation). In other words, the atomic Load-Store operation prohibits the processor from issuing any other operations until the FIFO Store Buffer of the processor is empty, and then proceeds to the single port Memory 50. When the Load-Store operation blocks the processor, no operations issued by the processor may be placed in the dedicated FIFO Store Buffer of the processor. The single port Memory 50 executes the atomic Load-Store operation atomically, i.e., no other operation may intervene in between the Load and the Store of the Load-Store operation.

The TSO memory model of the present invention delivers higher performance than the Strong Consistency memory model. Programs written for the TSO model will also run on computer systems that implement the Strong Consistency memory model.

In addition to the intuitive model shown in FIG. 5, the TSO model can also be described formally using six axioms, Order, Atomicity, Termination, Value, LoadOp and StoreStore. This formal description appears in appendix A.

PARTIAL STORE ORDERING (PSO)

Figure 6:
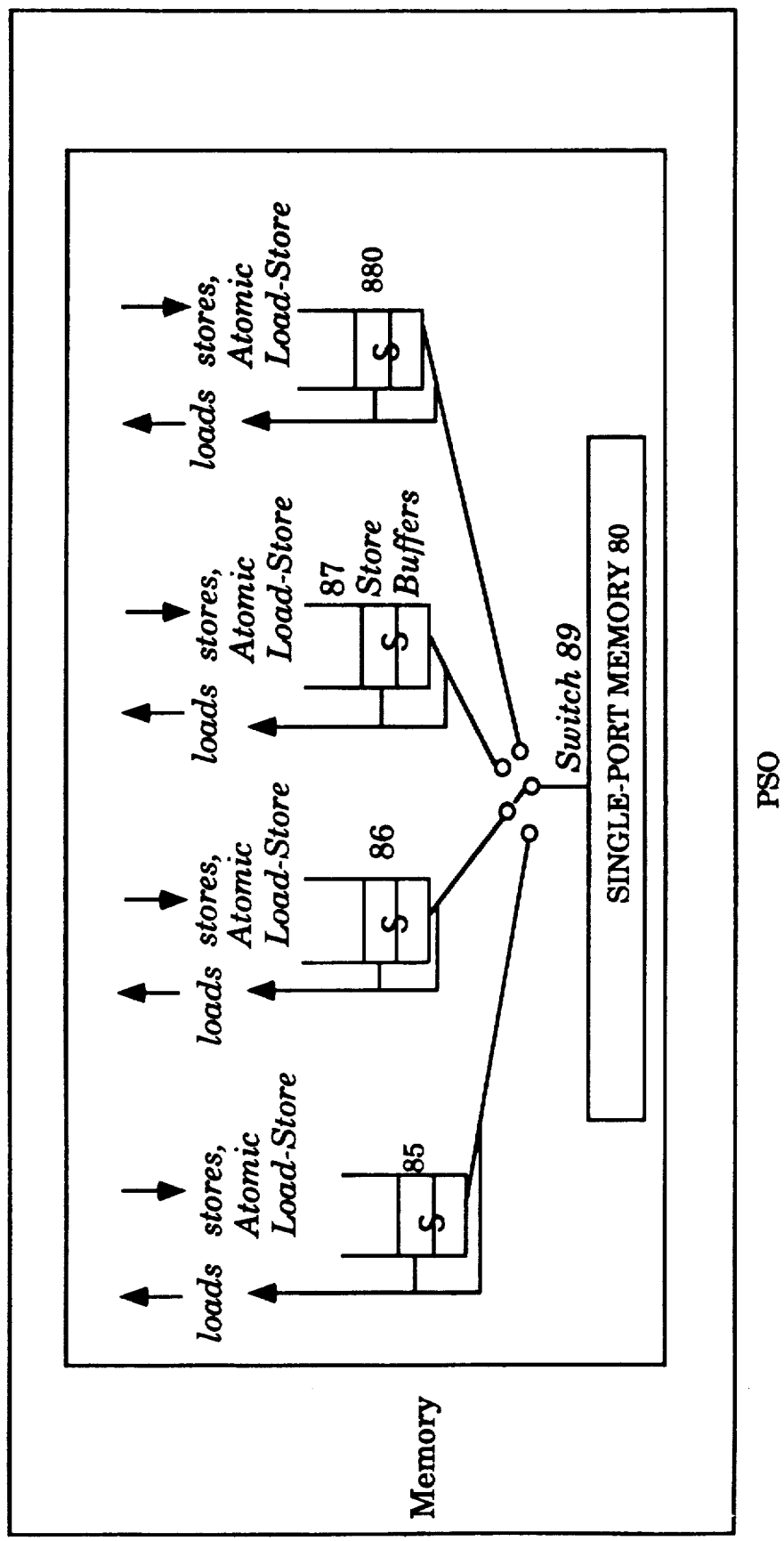
FIG. 6 is a conceptual illustration of a Partial Store Ordering (PSO) memory model utilizing the teachings of the present invention.

With reference to FIG. 6, a Partial Store Ordering (PSO) memory model of the present invention is conceptually illustrated in diagram form. The PSO model provides higher performance than both the TSO model and the Strong Consistency model. Moreover, programs written for the PSO model will also run on computer systems that implement the TSO model or computer systems that implement the Strong Consistency model. Similar to the TSO model, each port of a processor contains a dedicated Store Buffer into which Stores, Flushes, and atomic Load-Store operations issued by the processor are placed. However, the Store buffers in the PSO model are not FIFO, but are ordered by STBAR operations and address matches, such that two operations in the Store Buffer are ordered only if they were separated by the STBAR in the processor's issuing order or if they are issued to the same address. The Store, Flush, and atomic Load-Store issued by the processor are placed in the Store Buffer of the processor. The order of the memory operations corresponds to the order in which the ports of the processors are selected. Referring again to FIG. 6, the selection process is conceptually illustrated by a switch 89 connecting a single port Memory 80 to one of the ports of the processor at a time, for the duration of each memory operation. The order in which the switch 89 moves from one port to another is nondeterministic from the standpoint of programs and defines the memory order of the operations.

When a processor issues a Load operation, the processor first checks the Store Buffer of the processor to determine whether it contains a Store operation to the same memory location. If the Store Buffer of the processor contains a Store operation to the same memory location, the Load operation returns the value of the most recent Store operation; otherwise the Load operation goes directly to the single port Memory 80 (FIG. 6) and the Load operation also blocks the processor from issuing any further memory operations until the Load operation returns a value.

An atomic Load-Store operation behaves like a Load and a Store operation. The atomic Load-Store operation is placed in the Store Buffer (similar to a Store operation), and the atomic Load-Store operation also blocks the processor (similar to a Load operation). The single port Memory 80 executes the atomic Load-Store atomically, i.e., no other operation may intervene between the Load and the Store of an atomic Load-Store operation.

The PSO model can also be described formally with seven axioms, Order, Atomicity, Termination, Value, LoadOp, StoreStore, and StoreStoreEq. This formal description appears in appendix A.

SEMANTICS OF THE FLUSH INSTRUCTION

The Flush instruction ensures that subsequent instruction fetches to the target of the Flush (i.e., memory location addressed by the Flush) by the processor executing the Flush appear to execute after any Loads, Stores and atomic Load-Stores issued by that processor prior to the Flush. In a multiprocessor, Flush also ensures that stores and atomic Load-Stores to the target of the Flush issued by the processor executing the Flush prior to the Flush become visible to the instruction fetches of all other processors some time after the execution of the Flush. When a processor executes a sequence of Store or atomic Load-Stores interspersed with appropriate Flush and STBAR instructions (the latter instructions are needed only for PSO), the changes appear to the instruction fetches of all processors to occur in the order in which they were made.

Figure 7:
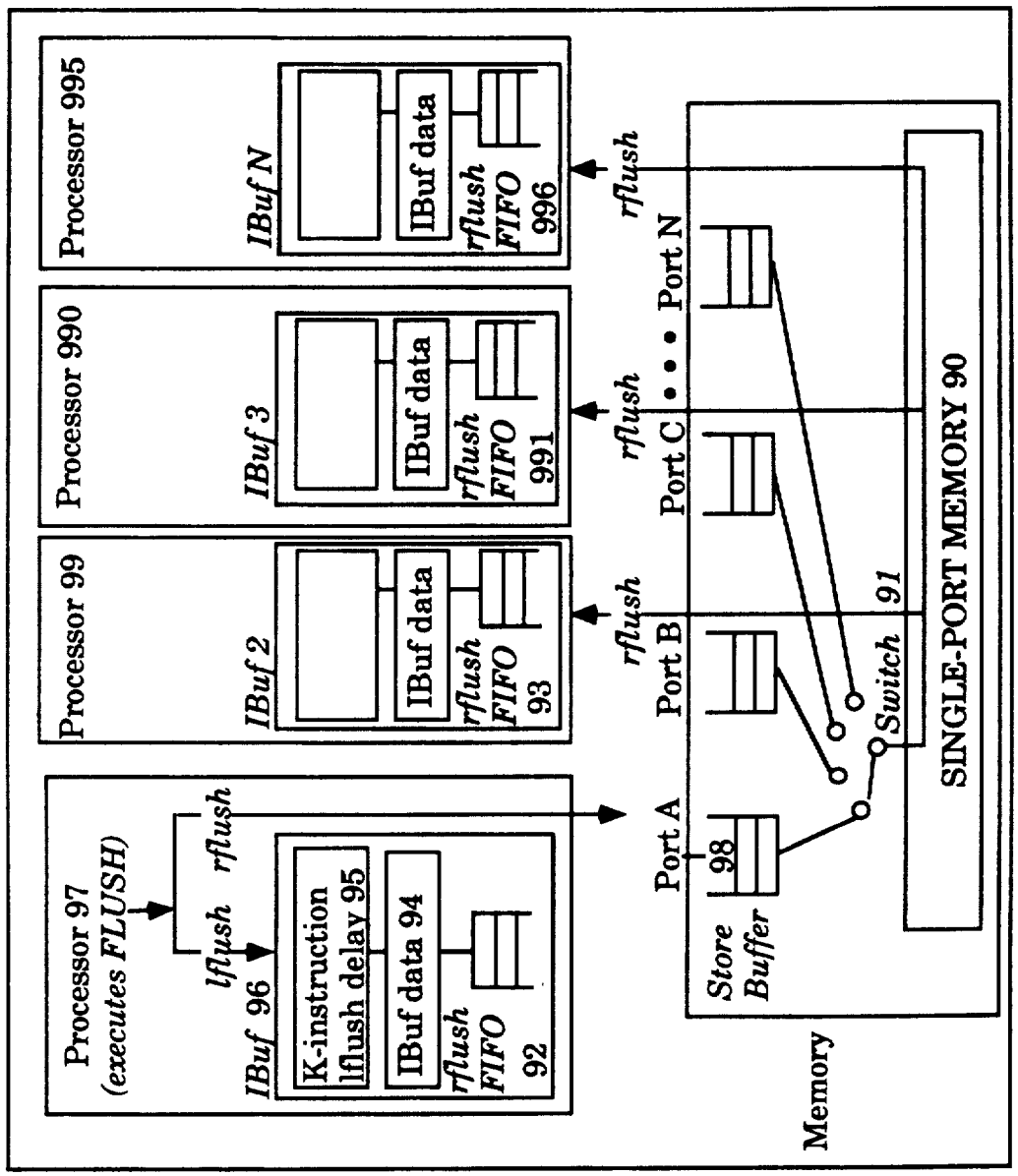
FIG. 7 is an illustration of a Flush instruction operation of a processor.

With reference to FIG. 7, a processor 97 executing a Flush instruction is conceptually illustrated in diagram form. The Instruction Buffer (IBuf) 96 of the processor 97 includes a local flush (lflush) delay 95, an IBuf data 94, and a remote flush (rflush) FIFO 92. The lflush delay 95 delays the execution of a locally generated Flush by some fixed number (K) of instructions. The IBuf data 94 contains the data of IBuf 96. The rflush FIFO 92 contains Flush operations generated by remote processors (e.g., 99, 990 and 995).

The processor 97 executes a Flush "A" operation by issuing a local flush (lflush) operation to the IBuf 96 and placing a remote flush operation (rflush) in the Store Buffer 98. The IBuf 96 executes the Iflush operation after a delay of some fixed number of instructions (K) by invalidating the contents of address "A" in IBuf 96. The rflush operation placed in the Store Buffer 98 is treated like a Store operation for ordering purposes, i.e., the rflush operation appears in the global memory order by conceptually going to the single port Memory 90 through the switch 91 and being placed in the rflush FIFO of other processors. The rflush FIFO of other processors are identified by the numerals 93, 991 and 996. The rflush operation does not have any effect on the contents of memory. A remote processor's IBuf invalidates the contents of memory address "A" when the rflush comes to the head of the rflush FIFO of that processor. For example, the IBuf 2 of the remote processor 99 invalidates the contents of address "A" when the rflush operation comes to the head of the rflush FIFO 93.

The Iflush operation guarantees that an Instruction Fetch to an address that was issued K instructions or more after a Flush operation by the processor will not be placed in the IBuf of the processor and will appear in the issuing order as an instruction Load at the port of the processor. For example, in response to a Flush "A" operation issued by the processor 97, the Iflush operation guarantees that any Instruction Fetch issued at least K instructions after the Flush "A" operation will not be placed in the IBuf 96 and will appear in the issuing order as an instruction Load at the port of processor 97.

In addition to the intuitive model shown in FIG. 7, the FLUSH instruction can also be described formally using three axioms, IFetch Value, Flush Termination, and IFetchIFetch. This formal description appears in appendix A.

PREFERRED EMBODIMENT

Figure 8:
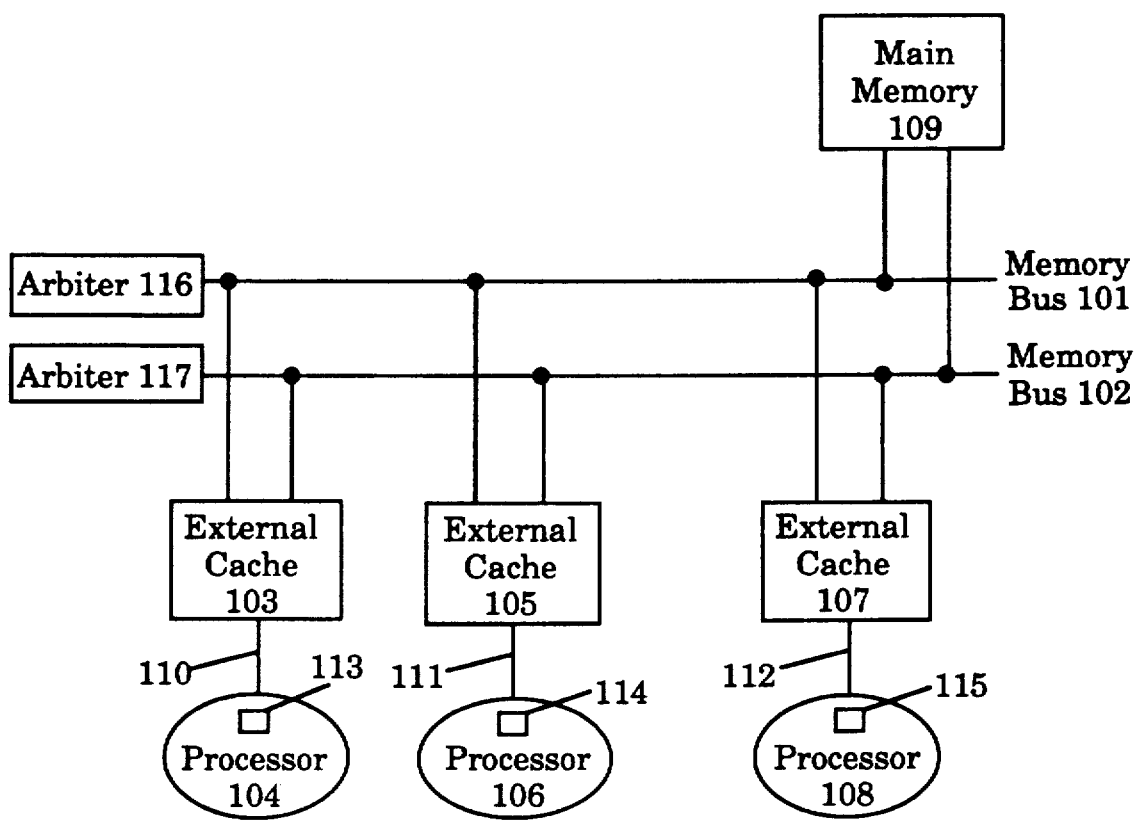
FIG. 8 is a conceptual illustration of a multiprocessor system illustrating a preferred embodiment utilizing the teachings of the present invention.

The following description of the preferred embodiment describes a multiple processor system coupled to a Main Memory incorporating the teachings of the present invention. With reference to FIG. 8, a multiprocessor system coupled to a Main Memory 109 is conceptually illustrated in diagram form. As shown, a processor 104 is coupled to a processor bus 110 and an External Cache 103. The External Cache 103 is coupled to both a Memory Bus 101 and a Memory Bus 102. Similarly, a processor 106 is coupled to processor bus 111 and to an External Cache 105. The External Cache 105 is coupled to both the Memory Bus 101 and the Memory Bus 102. As illustrated, a processor 108 is coupled to a processor bus 112 and an External Cache 107. The External Cache 107 is coupled to both the Memory Bus 101 and the Memory Bus 102. The Main Memory 109 is coupled to both the Memory Bus 101 and the Memory Bus 102. In this embodiment, two memory buses are implemented instead of one memory bus in order to provide higher bandwidth, which allows the system to be configured with more processors. Each memory bus has its own independent arbiter. For example, the Memory Bus 101 is coupled to an arbiter 116, and the Memory Bus 102 is coupled to an arbiter 117. For more information on the bus arbiter, see, copending U.S. patent application entitled "Arbitration of Packet Switched Buses, including Buses for Shared Memory Multiprocessor", Ser. No. 07/621,123, filed Nov. 30, 1990.

The External Cache of each processor (e.g., 103, 105 and 107) sends transactions to the Main Memory 109 over the memory buses. In the presently preferred embodiment, the Memory Bus 101 and the Memory Bus 102 are interleaved on the basis of transaction addresses.

Each of the memory buses supports at least four transactions, a ReadBlock transaction, a WriteShared transaction, an Atomic Op-Shared transaction, and a FlushBlock transaction. The ReadBlock transaction is issued by an External Cache (e.g., 103) to read a block of data from the Main Memory (e.g., 109) or from another External Cache (e.g., 105) when the requested data is not found in the External Cache (e.g., 103). A WriteShared is issued by an External Cache, for example, 103, to broadcast a write to all other External Caches, for example, 105 and 107, when a processor (e.g., 104) issues a Store operation to a shared location. A "shared" location is a block of memory which exists in more than one External Cache. An Atomic Op-Shared is issued by an External Cache, for example, 103, to broadcast an Atomic Load-Store operation to a shared location. A FlushBlock is issued by an External Cache (e.g., 103) to write a block of data back into the Main Memory (e.g., 109).

In addition to supporting the above transactions, each memory bus permits an External Cache (e.g., 103) to indicate to other External Caches (e.g., 105, 107) whether that External Cache (e.g., 103) has a memory block which has an address that appeared in a particular memory operation, and whether that memory block was last written into by that External Cache's processor (e.g., 104) (this is also referred to as "snooping"). If a memory block has been written into by an External Cache's processor, then that memory block is referred to as being "owned" by that processor. For more information on memory buses, see, copending U.S. patent application entitled "Consistent Packet Switched Bus for Shared Memory Multiprocessors", Ser. No. 07/620,508, filed Nov. 30, 1990.

Each processor has a mode bit which indicates whether the memory model being utilized is a TSO or PSO model. If the mode bit is set to the PSO model, then the processor issues the memory operations according to the Specifications of the PSO memory model. If the mode bit is set to the TSO model, then the processor issues the memory operations according to the Specifications of the TSO memory model.

Figure 9:
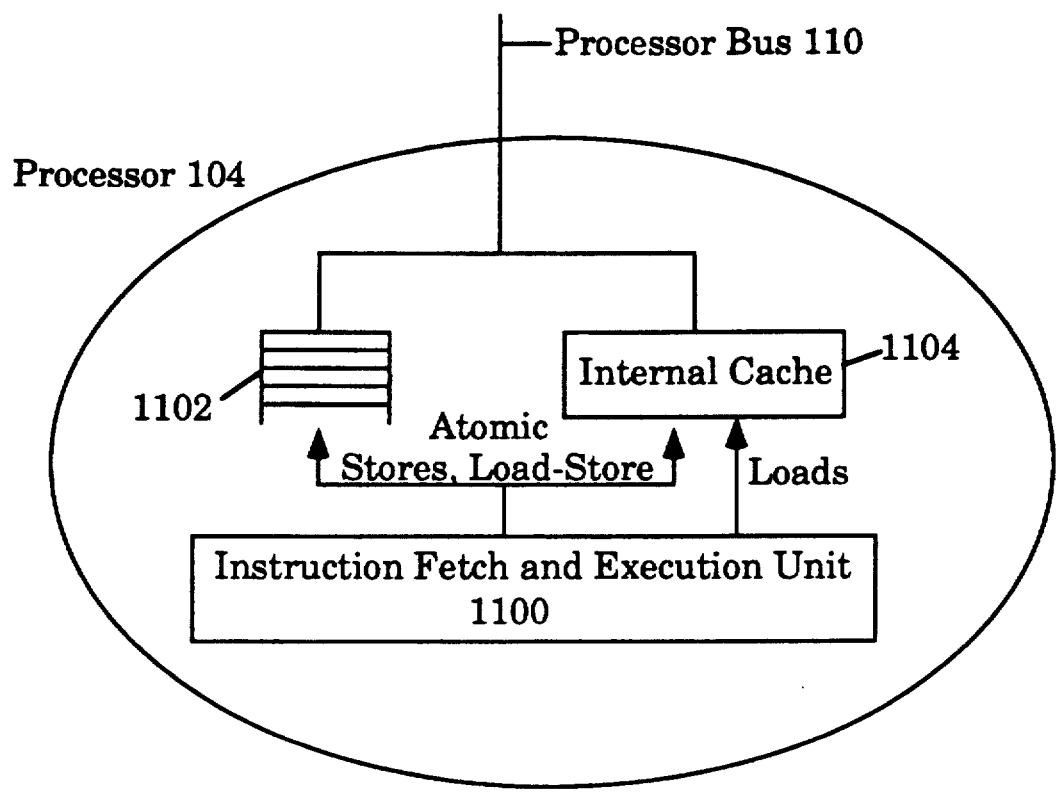
FIG. 9 is a more detailed conceptual illustration of a processor.

In addition to the Instruction Fetch and the Instruction Execution Unit, the processor (e.g., 104) also includes a Store Buffer and an Internal Cache. Referring to FIG. 9, a more detailed conceptual illustration of processor 104 is shown in diagrammatical form. The processor 104 includes a Store Buffer 1102, an Internal Cache 1104, and an Instruction Fetch and Execution Unit 1100. The Internal Cache 1104 holds the instructions and data of the processor 104. The contents of Internal Cache 1104 are also a subset of the contents of the respective External Cache of processor 104 (e.g., 103). When processor 104 issues a Store operation, and if the contents of Internal Cache 1104 also includes the same memory location referenced by the Store operation then the processor 104 updates the contents of Internal Cache 1104, otherwise the processor 104 bypasses the Internal Cache 1104. Regardless of the contents of Internal Cache 1104, the processor 104 issues the Store operation to the External Cache 103 of processor 104 through the processor bus 110 (FIG. 8). The Store Buffer 1102 is a FIFO queue which buffers Store and Atomic Load-Store operations issued by processor 104 before those operations go through the processor bus 110.

Figure 10:
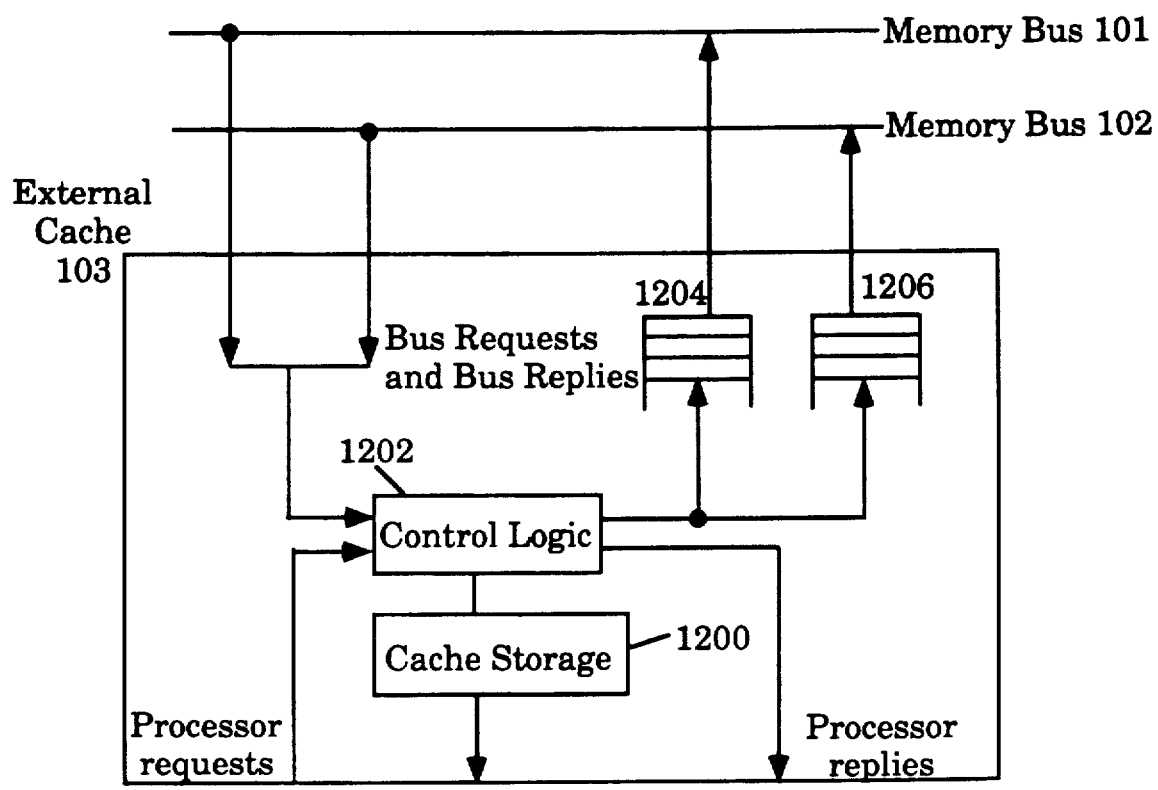
FIG. 10 is a conceptual illustration of an External Cache.

With reference to FIG. 10, a more detailed conceptual illustration of External Cache 103 is shown in diagram form. The External Cache 103 includes a Cache Storage 1200, a Control Logic 1202, a Queue 1204 and a Queue 1206. The Control Logic 1202 receives operations from a processor and determines whether the operations may be executed within the External Cache 103. If the operations may be executed entirely within the External Cache 103, then the Control Logic 1202 responds accordingly to the processor which issued the operations. For example, a processor may issue a load operation to the External Cache 103 and the External Cache 103 contains the data requested by the load operation, then the Control Logic 1202 determines the data from the Cache Storage 1200 and returns the data to the processor which issued the Load operation. If the External Cache 103 does not contain the data requested by the Load operation, then the Control Logic 1202 places a ReadBlock transaction in either Queue 1204 or Queue 1206 depending on the interleave of the address. This ReadBlock transaction goes on the appropriate bus (101 or 102) and some time later Main Memory 109 or another Cache (e.g., 105, 107) replies to the Read Block (FIG. 8). When the reply is received on the appropriate memory bus, the Control Logic 1202 sends the reply to the processor that issued the Load operation and writes the data from the ReadBlock reply into the Cache storage 1200.

When a processor issues a Store operation to a shared memory location, the Control Logic 1202 receives the Store operation and places the Store operation in either Queue 1204 or Queue 1206, depending on the address. The key thing to note is that because these queues go to independently arbitrated buses (i.e., the memory bus 101 or 102), there is no guarantee that the order in which Stores will eventually be performed is the same as the order in which they were issued by the processor. How this order is guaranteed by the implementation will be described below in the Store operation section.

The following example describes an implementation of memory operations issued by the processors to the Main Memory of the preferred embodiment utilizing the teachings of the present invention.

PSO MODE OPERATION

Description of the Load Operation

Referring to FIG. 9, when the processor 104 executes a Load instruction, the Execution Unit 1100 of the processor checks the Internal Cache 1100 for the requested data. In response to the Load instruction, if the requested data is found in the Internal Cache 1104 (this is also known as a "hit"), then Execution Unit 1104 reads the data from the Internal Cache 1104. If the requested data is not found in the Internal Cache 1104 (this is also known as a "miss"), then the processor 104 checks the Store Buffer 1102 to determine whether there is a Store operation to the same memory location. If there is a Store operation to the same memory location, then the Load operation returns the value written by the latest such Store operation, otherwise, the processor 104 issues the Load operation to the External Cache 103 through the processor bus 110. Referring to FIG. 8, in response to the Load operation, if the requested data is found in the External Cache 103, then the External Cache 103 returns the requested data to the processor 104 through the processor bus 110. If the requested data is not found in the External Cache 103, then the External Cache 103 issues a ReadBlock transaction of the appropriate memory bus (either the memory bus 101 or 102 depending on the interleave of the address) and waits for a reply. The External Cache 103 also issues a FlushBlock transaction to write the data to the Main Memory 109 if the Cache location that will be occupied by the address of the Load operation is currently being occupied by another address and that address is marked as "owned" by the External Cache 103. Referring to FIG. 10, when the reply to the ReadBlock is received, the External Cache 103 puts the data into the Cache Storage 1200 and returns the data in response to the Load operation to the processor bus.

Referring again to FIG. 9, when the processor 104 receives the data through the processor bus 110, the processor 104 places the data into the Internal Cache 1104 and also returns the data to the Execution Unit 1100.

Description of Store Operation

A Store instruction executed by the Execution Unit 1100 of the processor 104 is placed directly into the Store Buffer 1102 of that processor (FIG. 9). In response to the Store instruction, if the Internal Cache 1104 contains the addressed memory location, then the contents of the Internal Cache 1104 are also updated. Thus, all Store instructions issued by a processor are sent to the External Cache of that processor.

If the External Cache 103 of the processor 104 does not contain the memory location addressed by this Store operation then the External Cache 103 of that processor issues a ReadBlock transaction on the appropriate memory bus and waits for a reply on the memory bus (FIG. 8). The External Cache 103 also issues a FlushBlock to write back the data to the Main Memory 109 if the Cache location that will be occupied by the address of the Store operation is currently being occupied by another address and that address is marked as being "owned" by this External Cache 103. When the External Cache 103 receives the reply data from the appropriate memory bus in response to the ReadBlock transaction, the External Cache 103 puts the data in the Cache Storage of the External Cache 103 and responds to the Store operation as if the External Cache 103 had initially contained the memory location addressed by the Store operation.

If the External Cache 103 contains the memory location addressed by the Store operation, then the Control Logic 1202 determines whether the Cache location is shared or not (FIG. 10). If the Cache location in the External Cache 103 is not shared, then the Control Logic 1202 updates the Cache Storage 1200 with the value of the Store operation. If the Cache location in the External Cache 103 is shared, then the Control Logic 1202 sends a WriteShared transaction on the appropriate memory bus to the Main Memory 109. The Main Memory 109 generates a reply to the WriteShared transaction which contains the address and the data value that was present in the address. When the External Cache 103 receives the reply from the Main Memory 109, the External Cache 103 updates the Cache Storage 1200 with the value of the WriteShared.

Description of Atomic Load-Store Operation

The Atomic Load-Store instruction executed by an Execution Unit 1100 is placed directly into the Store Buffer 1102 (FIG. 9). The Execution Unit 1100 stalls until the Atomic Load-Store operation returns a value, i.e., it does not issue another instruction until the Atomic Load-Store returns a value. If the Internal Cache 1104 of the processor 104 contains the location addressed by the Atomic Load-Store operation, then the contents of the Internal Cache 1104 are also updated with the value being written by the Atomic Load-Store. Thus, all Atomic Load-Store operations are also sent to the External Cache (e.g., 103, similar to Store operations).

If the External Cache 103 does not contain the requested data in response to the Atomic Load-Store operation, then the External Cache 103 issues a ReadBlock transaction on the appropriate memory bus and waits for a reply (FIG. 8). The External Cache 103 also issues a FlushBlock transaction to write back the current data to the Main Memory 109 if the Cache location that will be occupied by the address of the Atomic Load-Store instruction is currently being occupied by another address and that address is marked as being "owned" by this External Cache 103 (FIG. 8). When the External Cache 103 receives the reply data from the appropriate memory bus in response to the ReadBlock, the External Cache 103 puts the data in the Cache Storage 1200 (FIG. 10) and responds to the Atomic Load-Store operation as if the External Cache 103 had initially contained the requested location.

If the External Cache 103 contains the location addressed by the Atomic Load-Store, then the Control Logic 1202 determines whether the Cache location is shared or not (FIG. 10). If the Cache location in the External Cache 103 is not shared, then the Control Logic 1202 atomically reads the location and writes the new value such that no Store may intervene between the read and the write. If the location in the External Cache 103 is shared, the Control Logic 1202 sends a Atomic Op-Shared transaction on the appropriate memory bus to the Main Memory 109 (FIG. 8). The Main Memory 109 generates a reply to the Atomic Op-Shared which contains the address and the value as the request part of the transaction. When the External Cache 103 receives the reply from the Main Memory 109, the External Cache 103 reads the Cache location and writes the new data value such that no Store operation may intervene between the read and the write. Finally, the External Cache 103 returns the data value read from the Cache location to the processor which issued the Atomic Load-Store operation through the processor bus. For example, the processor 104. When the processor 104 receives the data value returned by the Atomic Load-Store, the processor 104 sends the data value to the Execution Unit 1100, then the Execution Unit 1100 proceeds to execute the next instruction (FIG. 9).

Description of STBAR Operation

A STBAR operation issued by the Execution Unit 1100 is placed in the Store Buffer of the processor 104 (FIG. 9) (similar to a Store operation). When the STBAR operation reaches the head of the Store Buffer 1102, the processor 104 removes the STBAR from the Store Buffer 1102 and the processor 104 waits until all Store operations that were issued to the External Cache of that processor prior to the STBAR operations have completed execution before allowing subsequent Store operations to appear on the processor bus. The act of waiting by the processor allows the processor to fulfill the key ordering requirement of the PSO memory model such that all Store instructions issued before a STBAR instruction must complete execution before any of the Store instructions that were issued after a STBAR instruction. Note that the STBAR instruction does not block the execution unit of the processor (e.g., 1100).

Description of the Flush Instruction

A Flush instruction causes the Instruction Fetch and Execution Unit 1100 of the processor 104 to purge any internal instruction buffers and flush any internal pipe line stages that may be executing instructions which were issued after the Flush (FIG. 9).

Description of the ReadBlock Transaction

When the External Cache 103 receives a ReadBlock transaction from the memory bus (101 or 102), the External Cache 103 determines whether the address of the ReadBlock transaction is present in the Cache Storage of the External Cache and whether the address is "owned" by this External Cache (FIG. 8). Referring again to FIG. 10, if the address of the ReadBlock transaction is present in the Cache Storage and the address is "owned" by this External Cache 103, then this External Cache 103 prohibits the Main Memory 109 from replying to the ReadBlock request and generates a reply containing the data fetched from Cache Storage of this External Cache 103.

Description of the WriteShared Transaction

When the External Cache 103 issues a WriteShared to the Main Memory 109 and receives a reply, this External Cache 103 then writes the data of the reply to the Cache Storage 1200 (FIG. 10). Thereafter, this External Cache 103 marks the Cache location owned and notifies the processor 104 that the Store is completed (FIG. 8).

Referring again to FIG. 8, when the External Cache 103 receives from the Main Memory 109 a reply to a WriteShared that was issued by another External Cache 105, the External Cache 103 does nothing if the location addressed by the WriteShared does not exist within the External Cache 103. If the location does exist within the External Cache 103, the External Cache 103 writes the data to the Cache Storage of the External Cache 103, marks the location not owned, and sends a request to the Internal Cache of the processor 104 to invalidate the Cache location if it exists in the Internal Cache. The invalidation of the Internal Cache location maintains consistency of data between the External Cache and the Internal Cache of the processor because the contents of the Internal Cache are a subset of the contents of the External Cache. For more information on Cache coherency, see, copending U.S. patent application entitled "Consistency Protocols for Shared Memory Multiprocessors", Ser. No. 07/620,496, filed Nov. 30, 1990.

Description of Atomic Op-Shared Transaction

When the External Cache 103 issues an Atomic Op-Shared to the Main Memory 109 and receives a reply, this External Cache 103 marks the Cache location owned, atomically reads the old value and writes the new value into the Cache location and returns the value read from the Cache location to the processor (FIG. 8). When the External Cache 103 receives from the Main Memory 109 a reply to an Atomic Op-Shared that was issued by another External Cache 105, the External Cache 103 does nothing if the location addressed by Atomic Op-Shared does not exist within the External Cache 103. If the location addressed by Atomic Op-Shared does exist in the External Cache 103, then the External Cache 103 atomically reads the old value and writes the new value to the Cache Storage of the External Cache 103, marks the location not owned, and sends a request to the Internal Cache of the processor 104 to invalidate the Cache location if it exists in the internal Cache. The invalidation of the Cache location maintains consistency of data between the External Cache and the Internal Cache of the processor.

Description of the FlushBlock Transaction

The External Cache ignores the FlushBlock transaction on the memory bus.

TSO MODE OPERATION

Description of the Load Operation

The description of the Load Operation in TSO Mode is the same as in PSO mode (see page 17).

Description of the Store Operation

The description of the Store Operation in TSO Mode is the same as in PSO mode (see page 18), except that the processor 104 does not issue a Store operation on the processor bus 110 if a previously issued Store operation by the same processor 104 has not been completed.

Description of the Atomic Load-Store Operation

The description of the Atomic Load-Store Operation in TSO Mode is the same as in PSO mode (see page 19).

Description of the STBAR Operation

The processor ignores a STBAR operation when executing in TSO mode. In other words, the STBAR operation is executed as a null operation ("Nop").

Description of the Flush Instruction

The description of the Flush instruction in TSO Mode is the same as in PSO mode (see page 21).

Description of the ReadBlock Transaction

The description of the ReadBlock transaction in TSO Mode is the same as in PSO mode (see page 21).

Description of the WriteShared Transaction

The description of the WriteShared transaction in TSO Mode is the same as in PSO mode (see page 21).

Description of the Atomic Op-Shared Transaction

The description of the Atomic Op-Shared transaction in TSO Mode is the same as in PSO mode (see page 22).

Description of the Flushblock Transaction

The description of the Flushblock transaction in TSO Mode is the same as in PSO mode (see page 23).

APPENDIX A

The detailed descriptions below are presented largely in terms of architecture and symbolic representations of memory operations in a computer system. These architectures and symbolic descriptions and representations are one means used by those skilled in the data processing art to most effectively convey the substance of their work to others also skilled in the art. The following Axiomatic Description is provided to further define the previously described memory model of the present invention for both the TSO and PSO implementations.

It should be borne in mind that the present invention describes a memory model. This formal description specifies an interface between software programs and hardware implementations that may be implemented on any computer system.

The following describes the notations that will be used in the axioms.

A data Load operation is denoted by a L. A Store operation is denoted by a S. An atomic Load-Store is denoted by [L;S] where the square brackets [] represent Atomicity. The STBAR is denoted by a -S. An instruction Flush is denoted by a F. Instruction Fetch is denoted by IF, and an instruction Load is denoted by an IL. The value returned by a Load, Instruction Fetch, or Instruction Load, or Store operation is denoted by [Val]. The superscripts on L, S, -S, F, IF and IL refer to a processor number. The subscripts on those operations (i.e., L, S, -S, F, IF and IL) refer to memory locations. The number after a # indicates the value written by the Store operation. For example, $S^i_a \#0$ denotes a Store of a "0" to location "a" issued by processor i;

$L^i_a$ denotes a Load from location "a" issued by processor i;

$[L^i_a; S^i_a]$ denotes an atomic Load-Store to location "a" issued by processor i;

$-S^i$ denotes a STBAR issued by processor i;

$IL^i_a$ denotes an Instruction Load from location "a" issued by processor i;

$F^i_a$ denotes an Instruction Flush to location "a" issued by processor i;

$IF^i_a$ denotes an Instruction Fetch from location "a" issued by processor i;

$Val[L^i_a]$ denotes the value returned by a $L^i_a$ instruction;

$Val[S^i_a]$ denotes the value in location "a" immediately after stored by $S^i_a$;

SOp denotes a shorthand notation for S or F.

Op denotes a shorthand notation for L, S, or F.

(Op;)∞ denotes an infinite sequence of Op.

TSO Axioms

The semantics of the TSO memory model are described by six axioms, Order, Atomicity, Termination, Value, LoadOp, and StoreStore.

The Order axiom states that there exist a partial order (≦) for all Store and Flushes. The Order axiom is defined as:

$$(SOp^i_a \leq SOp^j_b) \lor (SOp^j_b \leq SOp^i_a).$$

The Atomicity axiom states that an atomic Load-Store operation issues the Load before the Store, i.e., the Load part of an Load-Store operation appears before the Store in the partial order (≦), and that between the Load and the Store there can be no other Stores in the memory order. The Atomicity axiom is defined as:

$$[L^i_a; S^i_a] \rightarrow (L^i_a \leq S^i_a) \land (\forall\ SOp^j_b:\ SOp^j_b \leq L^i_a \lor S^i_a \leq SOp^j_b).$$

The Termination axiom states that all Store and atomic Load-Store operations eventually terminate. This is formalized by indicating that if one processor issues a Store operation and another processor is repeatedly issuing a Load operation to the same memory location as the Store operation, then there is a Load operation that will be after the Store operation in the partial order ($\leq$). The Termination axiom is defined with the following:

$$S^i_a \wedge (L^j_{a_i}) \infty \rightarrow \exists \text{ an } L^j_a \text{ in } (L^j_{a_i}) \infty \text{ such that } S^i_a \leq L^j_a.$$

The Value axiom states that the value of a data Load is the value written by the most recent Store operation to that memory location. The Value axiom is defined by the following:

$$\text{Val}[L^i_a] = \text{Val}\left[S^j_a IS^j_a = \underset{\leq}{\text{Max}}[\{S^k_a IS^k_a \leq L^i_a\} \cup \{S^i_a IS^i_a; L^i_a\}]\right]$$

The LoadOp axiom states that in the operation issued after a Load operation appears later in the memory partial order ($\leq$). This axiom indicates that a processor waits for a Load operation to complete before issuing any subsequent operation. The LoadOp axiom is defined by the following:

$$L^i_a; \text{Op}^i_b \rightarrow L^i_a \leq \text{Op}^i_b.$$

The StoreStore axiom states that Store and Flush operations issued by a processor appear in the same order in the memory partial order ($\leq$). This axiom reflects the fact that memory executes the Store and Flush operation in the order in which the processor has issued them. The StoreStore axiom is defined by the following:

$$\text{SOp}^i_a; \text{SOp}^i_b \rightarrow \text{SOp}^i_a \leq \text{SOp}^i_b.$$

PSO Axioms

The PSO memory model is described by seven axioms, Order, Atomicity, Termination, Value, LoadOp, StoreStore, and StoreStoreEq. The axioms are defined in the following manner.

The Order axiom states that there exist a partial order ($\leq$) for all Store and Flushes. The Order axiom is defined as:

$$(\text{SOp}^i_a \leq \text{SOp}^j_b) \vee (\text{SOp}^j_b \leq \text{SOp}^i_a).$$

The Atomicity axiom states that an atomic Load-Store operation issues the load before the Store, i.e., the load part of an Load-Store operation appears before the Store in the partial order ($\leq$), and that between the Load and the Store there can be no other Stores in the memory order. The axiom is defined as:

$$[L^i_a; S^i_a] \rightarrow (L^i_a \leq S^i_a) \wedge (\forall \text{ SOp}^j_b; \text{SOp}^j_b \leq L^i_a \vee S^i_a \leq \text{SOp}^j_b).$$

The Termination axiom states that all Store and atomic Load-Store operations eventually terminate. This axiom is formalized by indicating that if one processor does a Store operation and another processor repeatedly does a Load operation to the same memory location as the Store operation, then there is a Load operation that will be after the Store operation. The Termination axiom is defined with the following:

$$S^i_a \wedge (L^j_{a_i}) \infty \rightarrow \exists \text{ an } L^j_a \text{ in } (L^j_{a_i}) \infty \text{ such that } S^i_a \leq L^j_a.$$

The Value axiom states that the value of a data load is the value written by the most recent Store operation to that memory location. The Value axiom is defined by the following:

$$\text{Val}[L^i_a] = \text{Val}\left[S^j_a IS^j_a = \underset{\leq}{\text{Max}}[\{S^k_a IS^k_a \leq L^i_a\} \cup \{S^i_a IS^i_a; L^i_a\}]\right]$$

The LoadOp axiom states that in the operation issued after a Load operation appears later in the memory partial order ($\leq$). This axiom indicates that a processor waits for a load operation to complete before issuing any subsequent operation. The LoadOp axiom is defined by the following:

$$L^i_a; \text{Op}^i_b \rightarrow L^i_a \leq \text{Op}^i_b.$$

The StoreStore axiom states that all operations separated by a STBAR in the execution order of the processor appear in the same order in the memory partial order ($\leq$). This axiom indicates that the memory executes Store and Flush operations in the same order as a processor issues them only if processor separates them by a STBAR. The StoreStore axiom is defined by the following:

$$\text{SOp}^i_a; S; \text{SOp}^i_b \rightarrow \text{SOp}^i_a \leq \text{SOp}^i_b.$$

The StoreStoreEq axiom states that the Store and Flush operations issued to a given memory location by a processor appear in the same order in the memory partial order ($\leq$). This axiom indicates that the memory executes the Store operations to the same memory location in the order in which they were issued by the processor even if the processor did not separate them with a STBAR.

The StoreStoreEq axiom is defined by the following:

$$\text{SOp}^i_a; \text{SOp}'^i_a \rightarrow \text{SOp}^i_a \leq \text{SOp}'^i_a.$$

Flush Axioms

The Flush instruction synchronizes the instruction fetches of the processor issuing the Flush to the Loads, Stores, and atomic Load-Stores of that processor, and forces the instruction fetches of all other processors to observe any Store done to the Flush target prior to the Flush.

The semantics of Flush are described by three axioms, IFetchValue, FlushTermination, and IFetchIFetch. In the IFetchValue axiom, the symbol "<K>" is used to denote an arbitrary sequence of K or more instructions.

The IFetchValue axiom states that the value of an instruction fetch is the value written by the most recent (S;F) sequence to that location. Two terms combine to define the most recent such sequence. The first term corresponds to sequences by other processors, while the second term corresponds to sequences by the processor that issued the Load. Note that in the first set of sequences, the store and the Flush may be issued by different processors. Also note that in the second set of sequences, the Flush must be followed by some arbitrary instructions before the instruction fetch to the Flush's target.

The IFetchValue axiom is defined by the following:

$$\text{Val}[IF^i_a] = \text{Val}\,[S^j_a \mid S^j_a =$$

-continued $$\text{Max}[\{S^k_a \mid S^k_a \leq F^i_a \leq IF^j_a\} \cup \{S^i_a \mid S^i_a; F^i_a; <K>; IF^j_a\}]] \leq$$

The FlushTermination axiom states that an S;F sequence done by one processor will eventually be observed by the instruction fetches of all processors.

The FlushTermination axiom is defined by the following:

$$(S^i_a; F^i_a;) \wedge (IF^j_a) \propto \rightarrow \exists \text{ an } IF^j_a \text{ in } (IF^j_a) \propto \text{ such that}$$
$$S^i_a \leq IF^j_a.$$

The IFetchIFetch axiom states that two instruction fetches issued by a processor appear in the same order in the partial order ($\leq$).

The IFetchIFetch axiom is defined by the following:

$$IF^i_a; IF^i_b \rightarrow IF^i_a \leq IF^i_b.$$

While the present invention has been described in conjunction with the preferred embodiment and axioms, it is evident that numerous alternatives, modifications, variations and uses will be apparent to those skilled in the art in light of the foregoing description.

We claim:

1. In a computer system comprising at least one processor and memory means, each processor comprising a store buffer, and generating memory operations for said memory means comprising Load and Store operations including a memory address, said Store operations further including data, a method for executing memory operations issued by a processor comprising the steps of:

storing each Store operation issued by a processor in a corresponding store buffer means of said issuing processor;

searching a store buffer means corresponding to a processor issuing a Load operation to determine whether said store buffer means contains a Store operation comprising the same memory address as said Load operation issued;

returning data most recently stored in said store buffer means from a Store operation when said Store operation contains the same memory address as said Load operation issued;

transferring said Load operation to said memory means for execution when no Store operation contains the same memory address as said Load operation issued;

prohibiting said processor issuing said Load operation from issuing additional memory operations until said memory means returns data for said Load operation issued;

issuing STBAR operations by placing a STBAR operation in said corresponding store buffer means to separate Store operations contained in said store buffer means when all Store operations issued before a STBAR operation must complete execution in said memory means before all Store operations issued after said STBAR operation;

ordering only said Store operations stored in said store buffer means in the order issued by said processor when Store operations comprise the same addresses; and transmitting said Store operations from said store buffer means to said memory means for execution of said Store operations such that when said STBAR operation is encountered in said store buffer means, a next successive Store operation in said store buffer means is not transferred to said memory means until completion of memory operations prior to said STBAR operation.

2. The method for executing memory operations from at least one processor as claimed in claim 1 wherein said memory operations further comprise an atomic Load-Store operation, said atomic Load-Store operation comprising a Load operation followed by a Store operation wherein said Store operation is dependent upon a value retrieved by said Load operation, said method comprising the steps of:

storing said atomic Load-Store operation in said store buffer means of said processor issuing said atomic Load-Store operation;

transferring said atomic Load-Store operation to said memory means for execution; and prohibiting said processor issuing said atomic Load-Store operation from issuing additional memory operations until said memory means returns data for said atomic Load-Store operation issued.

3. The method for executing memory operations from at least one processor as claimed in claim 1 wherein each processor comprises an internal cache for storing instructions and data of each corresponding processor, said method further comprising the steps of:

searching an internal cache for a corresponding processor issuing a Store operation to determine whether the requested memory address in said Store operation resides in said internal cache when said processor issues a Store operation;

updating data in said internal cache corresponding to the same memory address of said Store operation when a memory address of an issued Store operation resides in said internal cache;

searching an internal cache of a corresponding processor issuing a Load operation to determine whether an equivalent memory address resides in said internal cache when said processor issues a Load operation; and reading data of the corresponding location in the internal cache when a memory address of an issued Load operation resides in said internal cache.

4. The method for executing memory operations from at least one processor as claimed in claim 1 wherein said memory means comprises a main memory and, for each processor, an external cache for storing instructions and data for each corresponding processor, wherein executing said Load operation in said memory means comprises the steps of:

receiving a Load operation in said external cache from a processor and determining whether said load operation is executable within said external cache such that said external cache comprises a memory address equivalent to said load operation;

transmitting data at said memory address from said external cache to said processor when said external cache comprises a memory address equivalent to said Load operation;

executing a ReadBlock transaction to said main memory if a Load operation received from said processor is not executable within said external cache, said ReadBlock transaction transmitting data from said main memory to said external cache;

executing a FlushBlock transaction to said main memory;
updating said external cache with said data transmitted from said main memory; and
transmitting said data transmitted from main memory to said processor.

5. The method for executing memory operations from at least one processor as claimed in claim 1 wherein said memory means comprises a main memory and, for each processor, an external cache for storing instructions and data for each corresponding processor, wherein executing said Store operation in said memory means comprises the steps of:
receiving a Store operation in said external cache from a processor and determining whether said Store operation is executable within said external cache such that said external cache comprises a memory address equivalent to said Store operation;
storing data corresponding to said Store operation at said memory address in said external cache when said external cache comprises a memory address equivalent to said Store operation;
determining whether said memory address in said external cache is shared by another processor when said external cache comprises a memory address equivalent to said Store operation;
executing a WriteShared transaction to said main memory if said memory address is shared by another processor;
executing a ReadBlock transaction to said main memory if said Store operation received from said processor is not executable within said external cache, said ReadBlock transaction includes transmitting data located in said main memory at said memory address equivalent to said Store operation from said main memory to said external cache, storing said data transmitted in said external cache, and updating, in said external cache at said memory address equivalent to said Store operation, data from said Store operation; and
executing a FlushBlock transaction to said main memory, said FlushBlock transaction includes writing data from said external cache to said main memory if data stored in said external cache in response to said Store operation is written to a location in said external cache occupied by data owned by said external cache;

6. In a computer system comprising at least one processor and memory means, each processor comprising a store buffer, and generating memory operations for said memory means comprising Load and Store operations including a memory address, said Store instructions further including data, a method for executing memory operations issued by a processor comprising the steps of:
storing each Store operation issued by a processor in a corresponding store buffer means of said issuing processor, said Store operations being stored in an order issued by said processor;
searching a store buffer means corresponding to said processor issuing said Load operation to determine whether said store buffer means contains a Store operation comprising the same memory address as said Load operation issued;
returning data most recently stored in said store buffer means from a Store operation when said Store operation contains an equivalent memory address as said Load operation issued;
transferring said Load operation to said memory means for execution when no Store operation contains an equivalent memory address as said Load operation issued;
prohibiting said processor issuing said Load operation from issuing additional memory operations until said memory means returns data for said Load operation issued; and
transmitting said Store instructions from said store buffer means to said memory means for execution of said Store operations in the order stored in said store buffer means.

7. The method for executing memory operations from at least one processor as claimed in claim 6 wherein said memory operations further comprise an atomic Load-Store operation, said atomic Load-Store operation comprising a Load operation followed by a Store operation wherein said Store operation is dependent upon a value retrieved by said Load operation, said method comprising the steps of:
storing said atomic Load-Store operation in said store buffer means of said processor issuing said atomic Load-Store operation;
ordering said atomic Load-Store operation in said store buffer means in an order issued by said processor;
transferring said atomic Load-Store operation to said memory means for execution; and
prohibiting said processor issuing said atomic Load-Store operation from issuing additional memory operations until said memory means returns data for said atomic Load-Store operation issued.

8. The method for executing memory operations from at least one processor as claimed in claim 6 wherein each processor comprises an internal cache for storing instructions and data of each corresponding processor, said method further comprising the steps of:
searching an internal cache for a corresponding processor issuing a Store operation to determine whether the requested memory address in said Store operation resides in said internal cache when said processor issues a Store operation;
updating data in said internal cache corresponding to said equivalent memory address of said Store operation when a memory address of an issued Store operation resides in said internal cache;
searching an internal cache of a corresponding processor issuing a Load operation to determine whether an equivalent memory address resides in said internal cache when said processor issues a Load operation; and
reading data of the corresponding location in the internal cache when a memory address of an issued Load operation resides in said internal cache.

9. The method for executing memory operations from at least one processor as claimed in claim 6 wherein said memory means comprises a main memory and, for each processor, an external cache for storing instructions and data for each corresponding processor, wherein executing said Load operation in said memory means comprises the steps of:
receiving a Load operation in said external cache from a processor and determining whether said load operation is executable within said external cache such that said external cache comprises a memory address equivalent to said load operation;
transmitting data at said memory address from said external cache to said processor when said external cache comprises a memory address equivalent to said Load operation;

executing a ReadBlock transaction to said main memory if a Load operation received from said processor is not executable within said external cache, said ReadBlock transaction transmitting data from said main memory to said external cache;

executing a FlushBlock transaction to said main memory;

updating said external cache with said data transmitted from said main memory; and transmitting said data transmitted from main memory to said processor.

10. The method for executing memory operations from at least one processor as claimed in claim 6 wherein said memory means comprises a main memory and, for each processor, an external cache for storing instructions and data for each corresponding processor, wherein executing said Store operation in said memory means comprises the steps of:

receiving a Store operation in said external cache from a processor and determining whether said Store operation is executable within said external cache such that said external cache comprises a memory address equivalent to said Store operation;

storing data corresponding to said Store operation at said memory address in said external cache when said external cache comprises a memory address equivalent to said Store operation;

determining whether said memory address in said external cache is shared by another processor when said external cache comprises a memory address equivalent to said Store operation;

executing a WriteShared transaction to said main memory if said memory address is shared by another processor;

executing a ReadBlock transaction to said main memory if said Store operation received from said processor is not executable within said external cache, said ReadBlock transaction includes transmitting data located in said main memory at said memory address equivalent to said Store operation from said main memory to said external cache, storing said data transmitted in said external cache, and updating, in said external cache at said memory address equivalent to said Store operation, data from said Store operation; and executing a FlushBlock transaction to said main memory, said FlushBlock transaction includes writing data from said external cache to said main memory if data stored in said external cache in response to said Store operation is written to a location in said external cache occupied by data owned by said external cache.

11. In a computer system comprising at least one processor and memory means, each processor generating memory operations for said memory means comprising Load and Store operations including a memory address, said Store operations further including data, an apparatus for executing memory operations issued by a processor comprising:

store buffer means coupled to each processor for storing each Store operation issued by a processor;

comparison means coupled to said store buffer means for searching a store buffer means corresponding to a processor issuing a Load operation to determine whether said store buffer means contains a Store operation comprising the same memory address as said Load operation issued, said comparison means returning data most recently stored in said store buffer means from a Store operation when said Store operation contains the same memory address as said Load operation issued;

wait means for prohibiting said processor issuing said Load operation from issuing additional memory operations until said memory means returns data for said Load operation issued;

partial ordering means coupled to said store buffer means for ordering Store operations in said store buffer means, said ordering means issuing STBAR operations by placing a STBAR operation in said corresponding store buffer means to separate Store operations contained in said store buffer means when all Store operations issued before a STBAR operation must complete execution in said memory means before all Store operations issued after said STBAR operation, said partial ordering means ordering only said Store operations stored in said store buffer means in the order issued by said processor when Store operations comprise the same addresses; and transferring means coupled to said comparison means and said partial ordering means for transferring said Load and Store operations to said memory means, said transferring means transferring said Load operation to said memory means for execution when no Store operation contains the same memory address as said Load operation issued and transferring said Store operations from said store buffer means to said memory means for execution of said Store operations such that when said STBAR operation is encountered in said store buffer means, a next successive Store operation in said store buffer means is not transferred to said memory means until completion of memory operations prior to said STBAR operation.

12. The apparatus for executing memory operations from at least one processor as claimed in claim 11 wherein:

said memory operations further comprise an atomic Load-Store operation, said atomic Load-Store operation comprising a Load operation followed by a Store operation wherein said Store operation is dependent upon a value retrieved by said Load operation;

said store buffer means stores said atomic Load-Store operation in said store buffer means of said processor issuing said atomic Load-Store operation;

said partial ordering means ordering only said atomic Load-Store operations stored in said store buffer means in the issuing order when atomic Load-Store operations comprise the same addresses said transferring means transfers said atomic Load-Store operation to said memory means for execution; and said wait means prohibits said processor issuing said atomic Load-Store operation from issuing additional memory operations until said memory means returns data for said atomic Load-Store operation issued.

13. The apparatus for executing memory operations from at least one processor as claimed in claim 11 further comprising:

internal cache means coupled to each processor comprising instructions and data for each corresponding processor;

cache comparison means coupled to said internal cache means for searching an internal cache for a corresponding processor issuing a Store operation to determine whether the requested memory address in said Store operation resides in said internal cache when said processor issues a Store operation, and for searching an internal cache for a corresponding processor issuing a Load operation to determine whether the same memory address resides in said internal cache when said processor issues a Load operation; and cache access means coupled to said internal cache means for updating data in said internal cache corresponding to the same memory address of said Store operation when a memory address of an issued Store operation resides in said internal cache, and for reading data of the corresponding location in the internal cache when a memory address of an issued Load operation resides in said internal cache.

14. In a computer system comprising at least one processor and memory means, each processor generating memory operations for said memory means comprising Load and Store operations including a memory address, said Store operations further including data, an apparatus for executing memory operations issued by a processor comprising:

store buffer means coupled to each processor for storing each Store operation issued by a processor;

comparison means coupled to said store buffer means for searching a store buffer means corresponding to said processor issuing said Load operation to determine whether said store buffer means contains a Store operation comprising the same memory address as said Load operation issued, said comparison means returning data most recently stored in said store buffer means from a Store operation when said Store operation contains the same memory address as said Load operation issued;

wait means for prohibiting said processor issuing said Load operation from issuing additional memory operations until said memory means returns data for said Load operation issued;

total ordering means coupled to said store buffer means for ordering Store operations in said store buffer means in an order issued by said processor; and transferring means coupled to said comparison means and said total ordering means for transferring said Load and Store operations to said memory means, said transferring means transferring said Load operation to said memory means for execution when no Store operation contains the same memory address as said Load operation issued and transferring said Store instructions from said store buffer means to said memory means for execution of said memory operations in the order issued.

15. The apparatus for executing memory operations from at least one processor as claimed in claim 16 wherein:

said memory operations further comprise an atomic Load-Store operation, said atomic Load-Store operation comprising a Load operation followed by a Store operation wherein said Store operation is dependent upon a value retrieved by said Load operation;

said store buffer means stores said atomic Load-Store operation in said store buffer means of said processor issuing said atomic Load-Store operation;

said total ordering means ordering atomic Load-Store operations in said store buffer means in an order issued by said processor;

said transferring means transfers said atomic Load-Store operation to said memory means for execution; and said wait means prohibits said processor issuing said atomic Load-Store operation from issuing additional memory operations until said memory means returns data for said atomic Load-Store operation issued.

16. The apparatus for executing memory operations from at least one processor as claimed in claim 12 wherein each processor comprises an internal cache for storing instructions and data of each corresponding processor, said method further comprising:

internal cache means coupled to each processor comprising instructions and data for each corresponding processor;

cache comparison means coupled to said internal cache means for searching an internal cache for a corresponding processor issuing a Store operation to determine whether the requested memory address in said Store operation resides in said internal cache when said processor issues a Store operation and for searching an internal cache for a corresponding processor issuing a Load operation to determine whether the requested memory address resides in said internal cache when said processor issues a Load operation; and cache access means coupled to said internal cache means for updating data in said internal cache corresponding to said equivalent memory address of said Store operation when a memory address of an issued Store operation resides in said internal cache, and for reading data of the corresponding location in the internal cache when a memory address of an issued Load operation resides in said internal cache.

17. The apparatus for executing memory operations from at least one processor as claimed in claim 14 wherein said partial ordering means comprises a First-In-First-Out (FIFO) buffer.

* * * * *

UNITED STATES PATENT AND TRADEMARK OFFICE
CERTIFICATE OF CORRECTION

PATENT NO. : 5,265,233
DATED : November 23, 1993
INVENTOR(S) : Frailong et al.

It is certified that error appears in the above-identified patent and that said Letters Patent is hereby corrected as shown below:

In column 24, claim 15 at line 4, please delete " 16 " and insert -- 14 --.

In column 24, claim 16 at line 27, please delete " 12 " and insert -- 14 --.

Signed and Sealed this

Twenty-third Day of December, 1997

Attest:

BRUCE LEHMAN

*Attesting Officer*  *Commissioner of Patents and Trademarks*